United States Patent [19]

Eikelmann et al.

[11] Patent Number: 5,553,184

[45] Date of Patent: Sep. 3, 1996

[54] PROCESS FOR THE APPLICATION OF FIBER OPTICAL BUNDLES COMPRISING OPTICAL FIBERS

[75] Inventors: Eckard Eikelmann, Würselen; Stefan Keller; Tilo Pfeifer, both of Aachen, all of Germany

[73] Assignee: Fraunhofer-Gesellschaft Zur Forderung Der Angewandten Forschung E.V., Munich, Germany

[21] Appl. No.: 351,009

[22] Filed: Dec. 7, 1994

[51] Int. Cl.⁶ ........................................ G02B 6/04
[52] U.S. Cl. ................. 385/115; 250/227.2; 356/124
[58] Field of Search ................. 385/115–121, 147; 250/227.2, 227.27, 227.29; 356/73.1, 124, 124.5, 128

[56] References Cited

U.S. PATENT DOCUMENTS

| | | | |
|---|---|---|---|
| 4,516,743 | 5/1985 | Sweeney et al. | 244/3.13 |
| 4,626,863 | 12/1986 | Knop et al. | 343/781 P |
| 4,674,834 | 6/1987 | Margolin | 385/115 |
| 4,789,240 | 12/1988 | Bush | 356/345 |
| 5,115,127 | 5/1992 | Bobb et al. | 250/227.19 |
| 5,138,153 | 8/1992 | Gergely et al. | 385/12 |

FOREIGN PATENT DOCUMENTS 4042317  2/1992  Germany.

*Primary Examiner*—Akm E. Ullah
*Attorney, Agent, or Firm*—Popham, Haik, Schnobrich & Kaufman

[57] ABSTRACT

A process for applying fiber optical bundles comprising optical fibers for visual and measurement-related purposes is provided, in which process light is coupled into the fiber optical bundle on a launching side and is extracted from said fiber optical bundle on an output side. In so doing, the individual optical fibers are labelled on the output side, and following separation of the optical fibers, their output-sided representation of the coordinates are determined through threshold formation. Then the optical fibers determined on the output side are defined on the launching side; and their coordinates are also defined. Finally the position of the individual optical fibers at the output end are converted to the coordinates of the respective optical fiber at the launching end.

51 Claims, 3 Drawing Sheets

PROCESS FOR THE APPLICATION OF FIBER OPTICAL BUNDLES COMPRISING OPTICAL FIBERS

The invention relates to a process for applying fiber optical bundles comprising optical fibers for visual and measurement-related purposes, in which process light is coupled into the fiber optical bundle on a launching side and is extracted from said fiber optical bundle on an output side, the individual optical fibers are labelled on the output side and their output-sided coordinates are determined, whereupon each of the optical fibers determined on the output side is defined on the launching end and their launching sided coordinates are determined; and finally the output sided coordinates for each optical fiber are converted to the launching sided coordinates.

To transmit the picture in endoscopes or similar apparatuses, fiber optical bundles with parallel optical fibers have been used to date. Such fiber optical bundles are characterized in that the optical fibers on the launching side and on the output side are arranged approximately the same, and thus a picture that is coupled in can be reproduced directly via the output side. However, the production of such fiber optical bundles is complicated and the possible configurations of such optical fibers are very limited. The process used to date the most frequently with parallel arrangement of the optical fibers provides that the fibers fuse. The result is a decreased flexibility of the fiber optical bundle. In addition, the individual fibers often break. This state in turn often leads to expensive repair measures and down-time of the device.

Another drawback of the fiber optical bundles with parallel optical fibers for transmitting pictures is that additional optical waveguides for specific tasks, e.g., lighting and measurement-related applications, can be integrated, if at all, only at a very high cost.

When a picture is transmitted by way of fiber optical bundles, the picture defects can have different causes. Thus, for example, owing to the production tolerances, the parallelism of the optical fibers can be disturbed, so that the optical fibers on the output side exhibit a somewhat different configuration than on the launching side.

Since the pictures to be transmitted are usually coupled into the fiber optical bundle via a lens, chromatic aberrations and/or distortions can also occur, independently of the course of the optical fibers in the bundle. Said distortions means that, when a picture is transmitted, straight lines are reproduced as curved or bent lines.

For the purpose of handling, fiber optical bundles with non-parallel optical fibers are sturdier; and for the purpose of production they are less expensive than fiber optical bundles with parallel optical fibers, since in the case of the former the individual optical fibers between the launching and output side can be arranged loosely. However, the non-parallelism of the optical fibers has the drawback of a totally different arrangement of the optical fibers on the launching side and the output side. The result is that the launching sided position of an optical fiber determined on the output side is not known. Therefore, a picture that is coupled in is no longer recognizable by means of the output side without additional measures or is reproduced so as to be at least significantly falsified.

A fiber optical bundle comprising non-parallel optical fibers is known from the U.S. Pat. No. 4,674,834, where the optical fibers are arranged at random and area-by-area at one end and linearly at the other end. Here a process is disclosed that enables the positions of the individual optical fibers at the two ends of the fiber optical bundle to be allocated to each other. To this end, a narrow, slotted light source is guided past the linearly arranged end of the fiber optical bundle and simultaneously it is determined by means of photosensors at the other end, which optical fibers transmit light. The position of the light-guiding fibers and the respective position of the light source is then stored in a transformation matrix, with whose aid the positions of their two ends can be allocated to each optical fiber. However, owing to the linear arrangement at one of its ends, such a fiber optical bundle cannot serve to transmit two dimensional pictures.

A fiber optical bundle comprising non-parallel optical fibers is known from the DE 4 042 317 A1, whose optical fibers are arranged areally at both ends. Here the distinction between the ends is that the one side exhibits an unordered arrangement and the other side exhibits a fixed matrix-shaped arrangement of the optical fibers. The latter means that there the positions of the individual optical fibers are specified by means of a mechanical fixing.

Furthermore, a process is disclosed there, wherein for the purpose of setting up a transformation matrix the unordered end of the fiber optical bundle is illuminated sector-by-sector and the position of the illuminated fibers is determined at the matrix-shaped end. In this prior art process the position of the optical fibers at one end has to be determined by a mechanical method. However, it is very complicated to arrange the optical fibers at one end into a totally regular lattice. However, only in this way would the positions of the optical fibers be known with sufficient accuracy in order to avoid picture defects.

The object of the present invention is to provide a process of the aforementioned kind, in which in particular the aforementioned drawbacks of the process used in the past for applying fiber optical bundles are remedied.

To solve this problem, the invention provides for a process of the aforementioned kind that to define the output sided coordinates of the optical fibers on the launching side light is fed into the fiber optical bundles and the optical fibers are separated in their representation on the output end by means of threshold formation.

With this process it is possible to allocate to each other the launching sided and output sided coordinates of each optical fiber, even if the areal arrangement of the optical fibers is totally random on both the launching side and the output side. Thus, the sensor heads produced with such fiber optical bundles can be freely configured with virtually no bounds. Thus, it facilitates the opening of new fields of application even with respect to additional elements. Thus, specific additional fibers for illumination and/or measurement-related purposes can be integrated by a simple method into a fiber optical bundle.

Furthermore, after the coordinates have been defined by means of said threshold formation, the output-sided coordinates can usually be noted with more accuracy than in the case of the specified positions in matrix-shaped arrangement of optical fibers, since an absolutely dense packing of the optical fibers or an otherwise equidistant arrangement of the optical fibers cannot be obtained or only at a high cost.

Owing to the aforementioned advantages, the process according to the invention is especially usable for visual and measurement-related applications in both medical and also industrial endoscopy.

The process according to the invention can also be implemented in such a manner that the threshold formation is conducted in multiple steps with gray tone adjustments that deviate from each other, is conducted in multiple steps whereby the output sided coordinates of the optical fibers determined separately in the individual steps are stored.

Furthermore, the process according to the invention can be implemented in such an advantageous manner that the picture of the output side is filtered with a Sharpen fold-over filter prior to forming the threshold.

With a Sharpen fold-over filter the contrast of the representation of the optical fibers in the output sided arrangement can be increased, so that the individual optical fibers can be clearly distinguished from the background.

However, it can also be advantageous to implement the process of the invention in such a manner that for the purpose of filtering, the brightness of the picture of the output side is standardized; and the picture is correlated with a pattern fiber, where the pattern is slid over the picture and subtracted from the respective value of the picture.

This comparison of the brightness distribution of a pattern fiber with the picture of the output side enables a reliable identification of the individual fibers.

The process of the invention can also be implemented in such an advantageous manner that for separating the optical fibers that are still connected together in the representation on the output side, the picture is eroded at least once binarily, without erasing the fiber reproductions eroded into individual points.

Furthermore, the process of the invention can also be implemented in such an advantageous manner that to check and correct the previously determined output sided coordinates of an optical fiber a circle with the diameter of the optical fiber is described around the center point of the pixel of a picture of the output side (of the fiber bundle), which pixel is located on these coordinates and is located on the output side and around the center points of the pixels that are at least directly adjacent to this pixel; the average gray tone of the pixel lying in the respective circles is defined; and the center point coordinates of the circle with the highest average gray tone are accepted as the actual output sided coordinates of the optical fiber.

Furthermore, it is advantageous to implement the process of the invention in such a manner that the center point of the optical fiber is defined in an iteration process.

It is recommended that the iteration process be conducted until the starting coordinates agree with the resulting coordinates.

By means of the aforementioned process steps the output sided coordinates of the optical fibers can be determined with high accuracy.

The process of the invention can be implemented in such an advantageous manner that to determine the launching sided coordinates of each optical fiber determined on the output side, the fiber optical bundles are illuminated with light on the launching side; sharp-edged apertures are moved in the X and then Y direction between light source and launching side; and the position of the aperture edge is found through the bright/dark transition or dark/bright transition, induced by the aperture movement, on the output side of each optical fiber.

After this process step output sided and launching sided coordinates are known for each optical fiber, so that now a transformation matrix can be constructed for a subsequent transmission of the picture.

The accuracy of the process for determining the coordinates can be increased according to the invention by implementing the process in such a manner that the launching side is illuminated with parallel light.

Furthermore, the process of the invention can be implemented in such an advantageous manner that the sharp-edged apertures are moved step-by-step in the X and then in the Y direction in front of the launching side.

The process of the invention can also be implemented in such an advantageous manner that after specific travel distances of the apertures, which correspond to the radius of the optical fibers, the output sided gray tone of each optical fiber and the aperture position are stored.

An advantageous embodiment of the process of the invention results from defining by interpolation the launching sided coordinates of an optical fiber in the diagrams of the gray tone and aperture position at bright/dark or dark/bright transition.

Furthermore, it is advantageous to implement the process of the invention in such a manner that the launching sided coordinates of an optical fiber in the interpolated diagrams of gray tone and aperture position are defined by the aperture position with a 50% change in gray tone.

In addition, it can be advantageous to implement the process of the invention in such a manner that to optimize the determined launching sided coordinates of the optical fibers, a picture of the launching side is compared with a picture of the previously determined launching sided center points of the optical fibers, after both pictures has been modified to agree in size.

The possibility of determining with high accuracy the launching sided and output sided coordinates of each optical fiber makes it logical to use the process of the invention even with fiber optical bundles with parallel optical fibers. Thus, when a picture is transmitted, the picture defects, which were generated, e.g., due to the production-induced deviations from the parallelism, can be corrected by means of the established transformation table.

However, picture defects, which are generated by means of the optics, e.g. lenses, which can be components of the launching and/or output side, can also be corrected with the process of the invention. Thus, in particular distortions, which are induced by a lens when the picture is coupled in, can be corrected.

Similarly chromatic aberrations induced by a lens can also be corrected. To this end, the process of the invention can be implemented in such an advantageous manner that all of the process steps for each of the color channels used to transmit a color picture are conducted separately.

Thus, a separate transformation table is set up for each color channel, e.g. red, green and blue, so that the pictures of the individual colors that fall apart owing to the chromatic aberrations can be reassembled with a computer when the picture is shown.

The process according to the invention is described in the following with the aid of embodiments, using in part the drawings.

Figure 1:
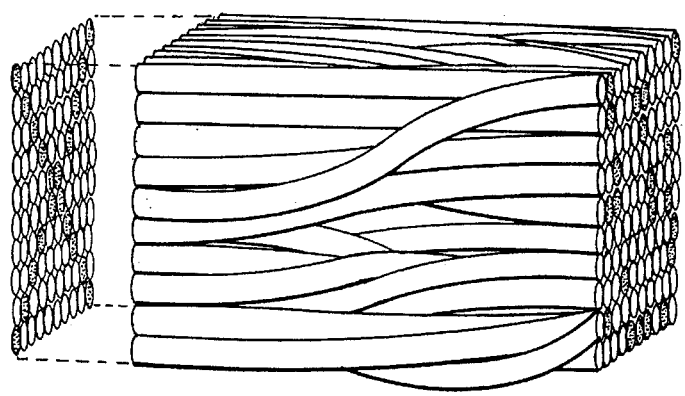
FIG. 1 is a schematic view of a fiber optical bundle with non-parallel optical fibers.

If an unordered fiber optical bundle (FIG. 1) is used for transmitting a picture, it is necessary to set up a transformation matrix in order to recover the picture information following dissection in the bundle. Only said transformation matrix allows the related pixel on the launching side, e.g. the sensor side, to be allocated to each pixel on the output side, which can be, for example, the camera side.

Both gradient and step index fibers can be used as optical waveguides. In contrast to the gradient fibers, step index fibers cannot transmit any pictures. Thus, for step index fibers there is no continuous correlation between place and direction, at which a light beam on the launching side penetrates into the fiber, and the place and direction, at which it exits again.

Therefore, it is sufficient to extract only the gray tone, averaged via the area of the fiber on the output side for each fiber, instead of evaluating individualy each camera pixel. The gray tone, determined thus is assigned to the place of the fiber on the launching side.

In this manner a transformation matrix with, for example, about 360,000 entries (approx. 600×600 pixels) can be reduced without any loss of information to one transformation table, which for each of the, e.g., 5,000 fibers of a sensor, contains one entry each for the coordinates of the launching and output side and clearly defines the fibers via the sequence of appearance in the table. In the case of gradient fibers, the resolution of individual points of a picture that is viewed can be resolved possibly better.

In the process in question here, the optical fibers on the output side were, first of all, labelled in order to set up the necessary transformation table and then their coordinates were determined. To illuminate the optical fibers uniformly, a diffuse illumination was conducted. In addition, an arrangement of three successive, milky white transparent plexiglass panes was constructed. Then a spot, which was larger than the active diameter of the fiber optical bundle= sensor, was projected with a halogen lamp on the first pane.

A standard video model with a resolution of 768×574 pixels was used as the camera. With a fiber diameter of 70 μm and approx. 5,000 optical fibers in the camera picture, the result was a reproduction of the fiber diameter on about 8 pixels. A micro zoom lens was used as the lens, which enabled a suitable reproduction scale, using different tube and auxiliary lenses.

The light guiding regions of the optical fibers used had a distance of about 10 μm. This distance could be recognized very well, if a suitably large enlargement was selected at the lens. The fibers were separated from the background by means of threshold formation.

If a reproduction scale was chosen that enabled the sensors to detect with a single pickup, then the fiber diameter moved into the order of magnitude of the lens' resolution. This means that the individual fibers fused. Thus, there was the problem that during subsequent evaluation on the output side the light of an illuminated fiber could cross talk on the neighboring fibers. The launching points of such adjacent fibers did not lie, however, directly next to those of the illuminated fibers. Thus, the crosstalked light appeared in the retransformed picture significantly farther from its origin than would have been caused just by the lack of definition alone. The results were grave picture defects.

The result was that first the place of each fiber had to be detected with accuracy. Each inaccuracy increased the effect. Secondly only a small central segment of the fiber, into which no light of the adjacent fiber penetrated, could be used to determine the gray tone.

Figure 3:
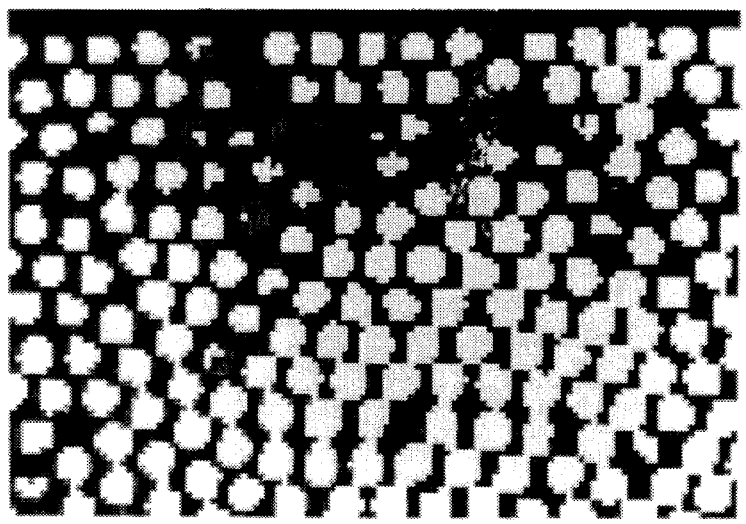
FIG. 3 depicts a separation of the fibers with simple threshold formation.

A simple threshold formation resulted in problems, since the gray tone between two closely adjacent fibers also occurred within other fibers. FIG. 3 illustrates this state by accentuating the threshold, thus the gray tone region was defined as the foreground.

It is evident from this figure that individual optical fibers are separated. Other optical fibers melt, however; and others drop out of the picture. To counteract this situation, a multistepped evaluation was applied. However, in so doing, it had to be observed that all of the fibers recognized in the different steps were also evaluated and detected. Thereupon the picture was filtered prior to the threshold formation, in order to extract more clearly the individual optical fibers. For the purpose of filtering, a Sharpen fold-over filter was used. It involved a 5×5 filter with the following kernel:

| 1 | 1  | 1  | 1  | 1 |
|---|----|----|----|---|
| 1 | −1 | −1 | −1 | 1 |
| 1 | −1 | 8  | −1 | 1 |
| 1 | −1 | −1 | −1 | 1 |
| 1 | 1  | 1  | 1  | 1 |

Figure 4:
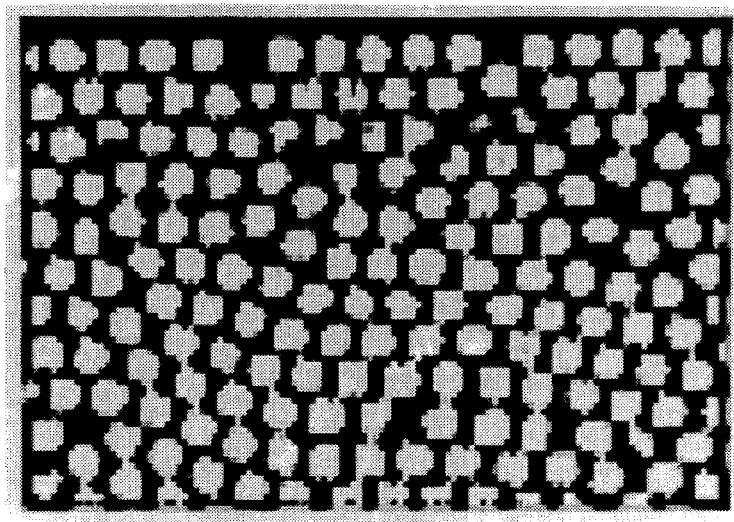
FIG. 4 depicts a separation of the fibers following formation of the threshold and use of a Sharpen filter.

A fiber picture (FIG. 4) folded with this kernel allowed a clear separation between fibers and background. This also applied in particular to darker fibers. To obtain optimally good filter results, the fibers could not be too highly illuminated.

Another possibility for filtering was recognized in that a correlation could be made between fiber picture and an individual pattern fiber. To this end, one individual fiber was cut out of the picture and the correlation was conducted with this picture. During the correlation the pattern was slid over the picture and subtracted from the picture at each point. Beforehand the brightness of the corresponding picture region was standardized, so that only the pure shape pattern had an influence on the measurement for the similarity.

The smaller this number with respect to amount is now, the more similar the regions. If the regions are identical, the difference is zero.

Subsequently the results had still to be standardized to the gray tone ranging from 0 to 255 and inverted, so that the fibers appeared as bright regions in a gray tone picture.

The correlation yielded useful results, which in the case cited, however, did not equal those of the modified Sharpen filter.

Figure 2:
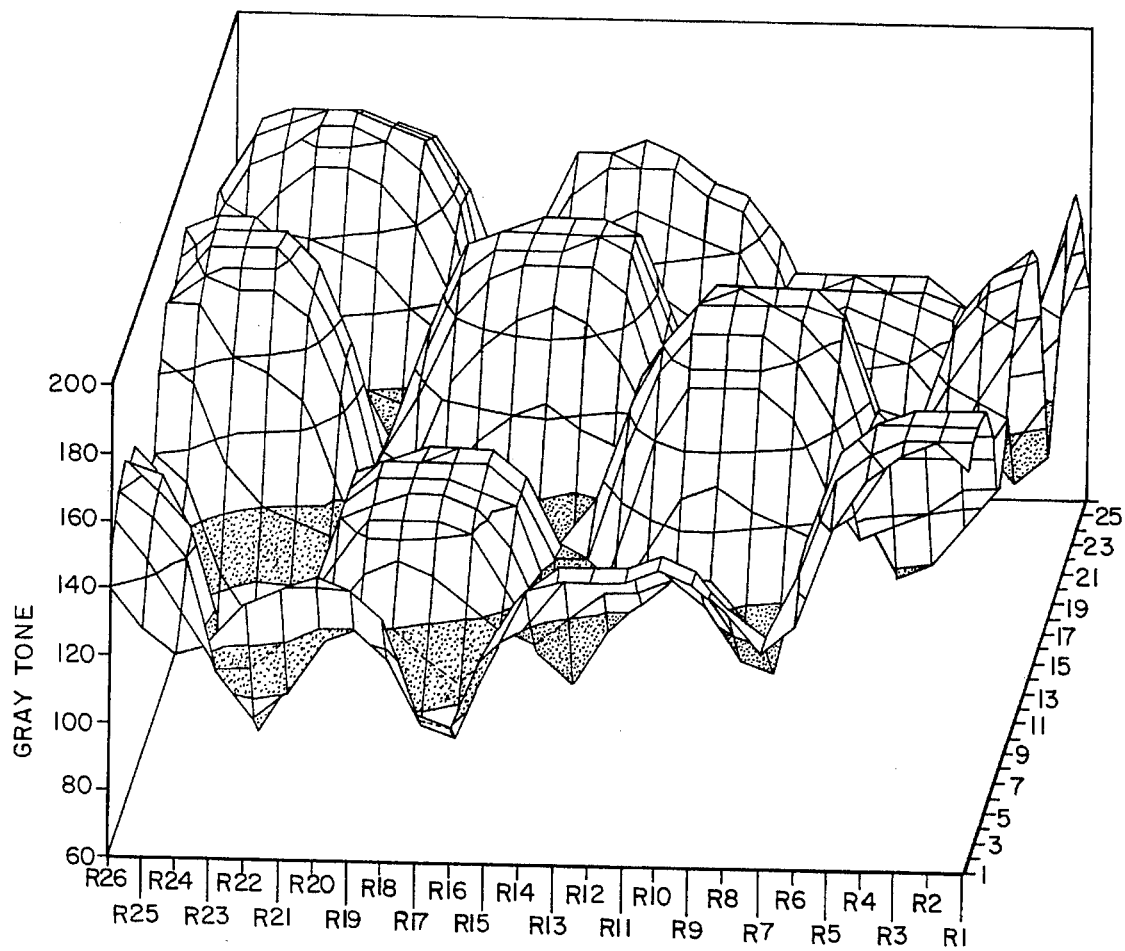
FIG. 2 is a three dimensional drawing of the gray tone pattern of the optical fibers on the output side.

In contrast, the correlation has the advantage that it can be adapted to larger and smaller fiber diameters without any problems. In contrast, with Sharpen filters one cannot reduce or enlarge without additional measures. Such a filter, however, still yields good results even for smaller diameters. Following filtering, some fibers were still connected together via webs. To separate them, the picture had to be eroded binarily several times, without, however, erasing the fibers eroded to individual points. The points obtained thus were regarded as approximately center points of the optical fibers. However, they still did not all lie exactly in the center point of the respective fiber. The crest of the gray tone hill of the fiber picture was regarded as the center point of the fiber (FIG. 2).

To find the exact center point of a fiber, an iteration process for optimization was used. To this end, a circle was described (for square pixels) in fiber size around the pixel, in which the center point was assumed, and around the next and second next neighboring pixels. Of the 25 circles the circle that had the highest average gray tone defined the optimal position of the fiber.

Figure 5:
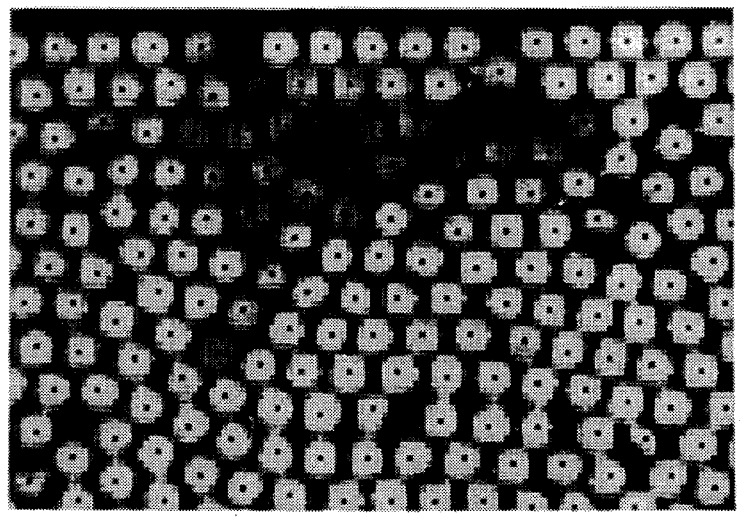
FIG. 5 depicts a fiber separation with optimized center points.

If the starting circle was not determined by this method, then another iteration step was conducted. The process terminated with the optimized center point. In so doing, two iteration steps were necessary on average (FIG. 5).

At this stage the position of each fiber on the output side was defined on the launching side. To this end, sharp-edged apertures were moved first in the X and then in the Y direction step-by-step in front of the launching side. Razor blades are especially suitable for this purpose.

Figure 7:
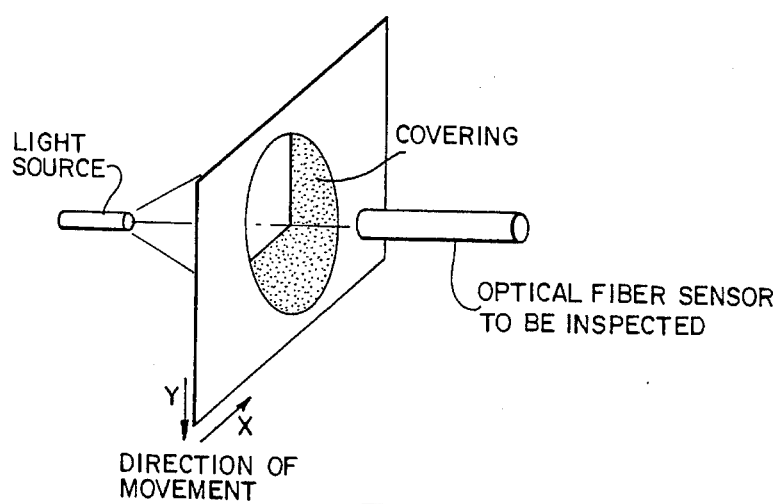
FIG. 7 is a schematic drawing concerning the use of two apertures that can be slid in the X or Y direction.

So that the edges of the apertures were reproduced as sharply as possibly, parallel illumination was used. A value of about 10 cm was found as the maximum distance between light source and launching side. Furthermore, it was found that the apertures had to be guided closely past the sensor (FIG. 7).

The blades used as the apertures were moved in 35 μm steps when the optical fibers exhibited a diameter of 70 μm. After each step the gray tone of the individual fibers was recorded and stored. The result was that the length of the edge transition was the size of the fiber diameter. This condition proved to be the possible lower limit, since a half shaded fiber still absorbs half of the light.

Figure 6:
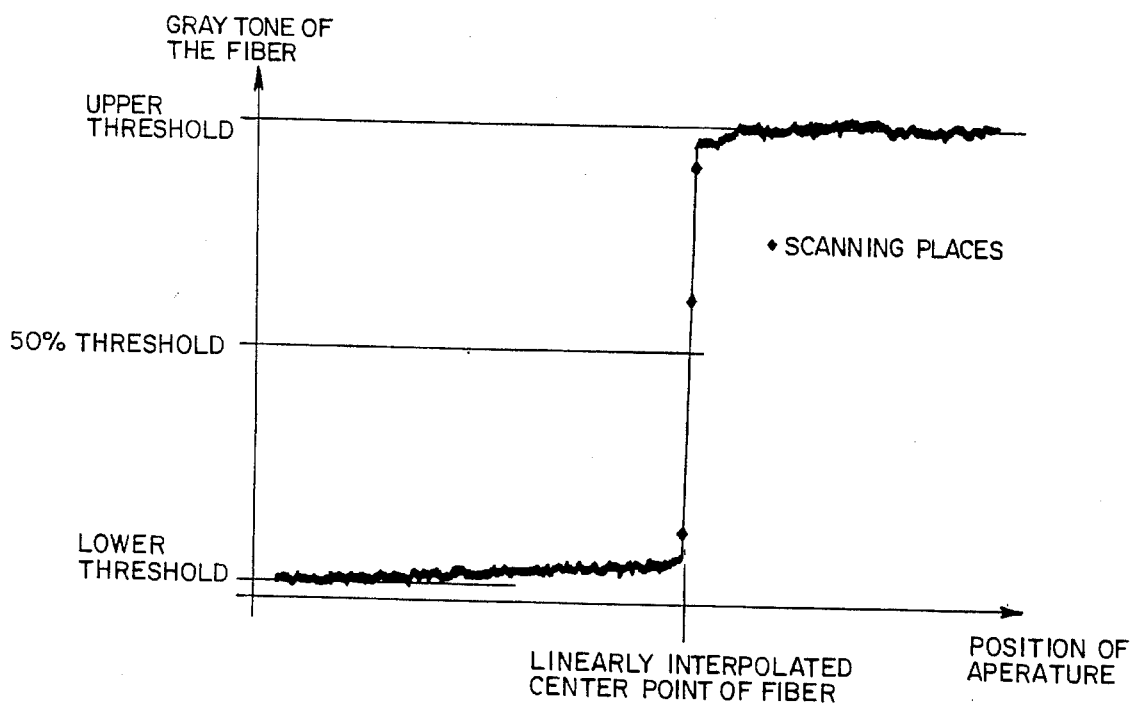
FIG. 6 is a diagram concerning the finding of fibers on the launching side by means of edge interpolation.

For the purpose of accurately defining the fiber place, an interpolation of the pattern of the edge was made (FIG. 6). To this end, those edge places for which 50% of the intensity could be reached with full illumination were accepted as the edge place. Between the individual scan steps there was a linear interpolation. To check the determined fiber center points, a camera picture of the launching side was superimposed with the found center pints. In addition, the coordinates of the center points were adapted to the size of the camera picture. If the pictures were not laid over each other, a slight twist was determined that can be explained by an inaccurate clamping of the two sides of the fiber optical bundle. Such a twist was calculated back by turning the picture.

A comparison of the center points with the fibers showed deviations of up to one-third of the fiber diameter.

These deviations can occur due to imprecise, rectangular or parallel attachment of the razor blades, displacement of the edge transition of individual fibers, due to slightly different launching angles or inaccuracies in the edge interpolation.

Since, however, despite the displacement the center points lay within the fibers, such errors could be corrected in the same manner as in the fiber finding on the output side, namely by searching for a circle the size of a fiber with maximum gray tone.

We claim:

1. Process for applying fiber optical bundles comprising optical fibers for visual and measurement-related purposes, in which process light is coupled into the fiber optical bundle on a launching side and is extracted from said fiber optical bundle on an output side, the individual optical fibers are labelled on the output side and their output-side coordinates are determined, whereupon each of the optical fibers determined on the output side is defined on the launching end and their launching side coordinates are determined; and finally the output sided coordinates for each optical fiber are converted to the launching side coordinates, wherein for the purpose of defining the output side coordinates of the optical fibers on the launching side, light is fed into the fiber optical bundles and the optical fibers are separated in their representation on the output end by means of threshold formation.

2. Process, as claimed in claim 1, wherein the threshold formation is conducted in multiple steps with gray tone adjustments that deviate from each other, whereby the output sided coordinates of the optical fibers determined separately in the individual steps are stored.

3. Process, as claimed in claim 1, wherein the picture of the output side is filtered with a Sharpen fold-over filter prior to forming the threshold.

4. Process, as claimed in claim 1 or 2, wherein for the purpose of filtering, the brightness of the picture of the output side is standardized; and the picture is correlated with a pattern fiber, where the pattern is slid over the picture and subtracted from the respective value of the picture.

5. Process, as claimed in claim 1, wherein for the purpose of separating the optical fibers that are still connected together in the representation on the output side, the picture is eroded at least once binarily, without erasing the fiber reproductions eroded into individual points.

6. Process, as claimed in claim 1, wherein to check and correct the previously determined output sided coordinates of an optical fiber, a circle with the diameter of the optical fiber is described around the center point of a pixel located on these coordinates of a picture of the output side and around the center points of the pixels that are at least directly adjacent to this pixel;

the average gray tone of the pixel lying in the respective circles is defined; and the center point coordinates of the circle with the highest average gray tone are accepted as the actual output sided coordinates of the optical fiber.

7. Process, as claimed in claim 6, wherein the center point of the optical fiber is defined in an iteration process.

8. Process, as claimed in claim 1, wherein to determine the launching sided coordinates of each optical fiber determined on the output side, the fiber optical bundles are illuminated with light on the launching side;

sharp-edged apertures are moved in the X and then Y direction between light source and launching side;

and the position of the aperture edge is found through the bright/dark transition or dark/bright transition, induced by the aperture movement, on the output side of each optical fiber.

9. Process, as claimed in claim 8, wherein the launching side is illuminated with parallel light.

10. Process, as claimed in claim 8, wherein the sharp-edged apertures are moved step-by-step in the X and then in the Y direction in front of the launching side.

11. Process, as claimed in claim 8, wherein after specific travel distances of the apertures, which correspond preferably to the radius of the optical fibers, the output sided gray tone of each optical fiber and the aperture position are stored.

12. Process, as claimed in claim 11, wherein the launching sided coordinates of an optical fiber in the diagrams of the gray tone and aperture position at bright/dark or dark/bright transition are defined through interpolation.

13. Process, as claimed in claim 12, wherein the launching sided coordinates of an optical fiber in the interpolated diagrams of gray tone and aperture position are defined by the aperture position with a 50% change in gray tone.

14. Process, as claimed in claim 8, wherein to optimize the determined launching sided coordinates of the optical fibers, a picture of the launching side is compared with a picture of the previously determined launching sided center points of the optical fibers, after both pictures have been adapted to a conforming size.

15. Process, as claimed in claim 1, wherein all of the process steps for each of the color channels used to transmit a color picture are conducted separately.

16. Process, as claimed in claim 2, wherein the picture of the output side is filtered with a Sharpen fold-over filter prior to forming the threshold.

17. Process, as claimed in claim 2, wherein for the purpose of filtering, the brightness of the picture of the output side is standardized; and the picture is correlated with a pattern fiber, where the pattern is slid over the picture and subtracted from the respective value of the picture.

18. Process, as claimed in claim 2, wherein for the purpose of separating the optical fibers that are still connected together in the representation on the output side, the picture is eroded at least once binarily, without erasing the fiber reproductions eroded into individual points.

19. Process, as claimed in claim 3, wherein for the purpose of separating the optical fibers that are still connected together in the representation on the output side, the picture is eroded at least once binarily, without erasing the fiber reproductions eroded into individual points.

20. Process, as claimed in claim 4, wherein for the purpose of separating the optical fibers that are still connected together in the representation on the output side, the picture is eroded at least once binarily, without erasing the fiber reproductions eroded into individual points.

21. Process, as claimed in claim 2, wherein to check and correct the previously determined output sided coordinates of an optical fiber, a circle with the diameter of the optical fiber is described around the center point of a pixel located on these coordinates of a picture of the output side and around the center points of the pixels that are at least directly adjacent to this pixel;

the average gray tone of the pixel lying in the respective circles is defined; and the center point coordinates of the circle with the highest average gray tone are accepted as the actual output sided coordinates of the optical fiber.

22. Process, as claimed in claim 3, wherein to check and correct the previously determined output sided coordinates of an optical fiber, a circle with the diameter of the optical fiber is described around the center point of a pixel located on these coordinates of a picture of the output side and around the center points of the pixels that are at least directly adjacent to this pixel;

the average gray tone of the pixel lying in the respective circles is defined; and the center point coordinates of the circle with the highest average gray tone are accepted as the actual output sided coordinates of the optical fiber.

23. Process, as claimed in claim 4, wherein to check and correct the previously determined output sided coordinates of an optical fiber, a circle with the diameter of the optical fiber is described around the center point of a pixel located on these coordinates of a picture of the output side and around the center points of the pixels that are at least directly adjacent to this pixel;

the average gray tone of the pixel lying in the respective circles is defined; and the center point coordinates of the circle with the highest average gray tone are accepted as the actual output sided coordinates of the optical fiber.

24. Process, as claimed in claim 5, wherein to check and correct the previously determined output sided coordinates of an optical fiber, a circle with the diameter of the optical fiber is described around the center point of a pixel located on these coordinates of a picture of the output side and around the center points of the pixels that are at least directly adjacent to this pixel;

the average gray tone of the pixel lying in the respective circles is defined; and the center point coordinates of the circle with the highest average gray tone are accepted as the actual output sided coordinates of the optical fiber.

25. Process, as claimed in claim 2, wherein to determine the launching sided coordinates of each optical fiber determined on the output side, the fiber optical bundles are illuminated with light on the launching side;

sharp-edged apertures are moved in the X and then Y direction between light source and launching side;

and the position of the aperture edge is found through the bright/dark transition or dark/bright transition, induced by the aperture movement, on the output side of each optical fiber.

26. Process, as claimed in claim 3, wherein to determine the launching sided coordinates of each optical fiber determined on the output side, the fiber optical bundles are illuminated with light on the launching side;

sharp-edged apertures are moved in the X and then Y direction between light source and launching side;

and the position of the aperture edge is found through the bright/dark transition or dark/bright transition, induced by the aperture movement, on the output side of each optical fiber.

27. Process, as claimed in claim 4, wherein to determine the launching sided coordinates of each optical fiber determined on the output side, the fiber optical bundles are illuminated with light on the launching side;

sharp-edged apertures are moved in the X and then Y direction between light source and launching side;

and the position of the aperture edge is found through the bright/dark transition or dark/bright transition, induced by the aperture movement, on the output side of each optical fiber.

28. Process, as claimed in claim 5, wherein to determine the launching sided coordinates of each optical fiber determined on the output side, the fiber optical bundles are illuminated with light on the launching side;

sharp-edged apertures are moved in the X and then Y direction between light source and launching side;

and the position of the aperture edge is found through the bright/dark transition or dark/bright transition, induced by the aperture movement, on the output side of each optical fiber.

29. Process, as claimed in claim 6, wherein to determine the launching sided coordinates of each optical fiber determined on the output side, the fiber optical bundles are illuminated with light on the launching side;

sharp-edged apertures are moved in the X and then Y direction between light source and launching side;

and the position of the aperture edge is found through the bright/dark transition or dark/bright transition, induced by the aperture movement, on the output side of each optical fiber.

30. Process, as claimed in claim 7, wherein to determine the launching sided coordinates of each optical fiber determined on the output side, the fiber optical bundles are illuminated with light on the launching side;

sharp-edged apertures are moved in the X and then Y direction between light source and launching side;

and the position of the aperture edge is found through the bright/dark transition or dark/bright transition, induced by the aperture movement, on the output side of each optical fiber.

31. Process, as claimed in claim 9, wherein the sharp-edge apertures are moved step-by-step in the X and then in the Y direction in front of the launching side.

32. Process, as claimed in claim 9, wherein after specific travel distances of the apertures, which correspond preferably to the radius of the optical fibers, the output sided gray tone of each optical fiber and the aperture position are stored.

33. Process, as claimed in claim 10, wherein after specific travel distances of the apertures, which correspond preferably to the radius of the optical fibers, the output sided gray tone of each optical fiber and the aperture position are stored.

34. Process, as claimed in claim 9, wherein to optimize the determined launching sided coordinates of the optical fibers, a picture of the launching side is compare with a picture of the previously determined launching sided center points of the optical fibers, after both pictures have been adapted to a conforming size.

35. Process, as claimed in claim 10, wherein to optimize the determined launching sided coordinates of the optical fibers, a picture of the launching side is compare with a picture of the previously determined launching sided center points of the optical fibers, after both pictures have been adapted to a conforming size.

36. Process, as claimed in claim 11, wherein to optimize the determined launching sided coordinates of the optical fibers, a picture of the launching side is compare with a picture of the previously determined launching sided center points of the optical fibers, after both pictures have been adapted to a conforming size.

37. Process, as claimed in claim 12, wherein to optimize the determined launching sided coordinates of the optical fibers, a picture of the launching side is compare with a picture of the previously determined launching sided center points of the optical fibers, after both pictures have been adapted to a conforming size.

38. Process, as claimed in claim 13, wherein to optimize the determined launching sided coordinates of the optical fibers, a picture of the launching side is compare with a picture of the previously determined launching sided center points of the optical fibers, after both pictures have been adapted to a conforming size.

39. Process, as claimed in claim 2, wherein all of the process steps for each of the color channels used to transmit a color picture are conducted separately.

40. Process, as claimed in claim 3, wherein all of the process steps for each of the color channels used to transmit a color picture are conducted separately.

41. Process, as claimed in claim 4, wherein all of the process steps for each of the color channels used to transmit a color picture are conducted separately.

42. Process, as claimed in claim 5, wherein all of the process steps for each of the color channels used to transmit a color picture are conducted separately.

43. Process, as claimed in claim 6, wherein all of the process steps for each of the color channels used to transmit a color picture are conducted separately.

44. Process, as claimed in claim 7, wherein all of the process steps for each of the color channels used to transmit a color picture are conducted separately.

45. Process, as claimed in claim 8, wherein all of the process steps for each of the color channels used to transmit a color picture are conducted separately.

46. Process, as claimed in claim 9, wherein all of the process steps for each of the color channels used to transmit a color picture are conducted separately.

47. Process, as claimed in claim 10, wherein all of the process steps for each of the color channels used to transmit a color picture are conducted separately.

48. Process, as claimed in claim 11, wherein all of the process steps for each of the color channels used to transmit a color picture are conducted separately.

49. Process, as claimed in claim 12, wherein all of the process steps for each of the color channels used to transmit a color picture are conducted separately.

50. Process, as claimed in claim 13, wherein all of the process steps for each of the color channels used to transmit a color picture are conducted separately.

51. Process, as claimed in claim 14, wherein all of the process steps for each of the color channels used to transmit a color picture are conducted separately.

* * * * *